(12) United States Patent
Machida et al.

(10) Patent No.: US 8,928,649 B2
(45) Date of Patent: Jan. 6, 2015

(54) DISPLAY MEDIUM AND DISPLAY APPARATUS

(75) Inventors: Yoshinori Machida, Kanagawa (JP); Naoki Hiji, Kanagawa (JP); Ryota Mizutani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1151 days.

(21) Appl. No.: 12/880,542

(22) Filed: Sep. 13, 2010

(65) Prior Publication Data
US 2011/0175893 A1 Jul. 21, 2011

(30) Foreign Application Priority Data
Jan. 18, 2010 (JP) .................................. 2010-008478

(51) Int. Cl.
G06F 3/038 (2013.01)
G09G 5/00 (2006.01)
G02F 1/167 (2006.01)

(52) U.S. Cl.
CPC ........ *G02F 1/167* (2013.01); *G02F 2001/1676* (2013.01)
USPC ............. 345/212; 345/96; 359/296; 257/414; 349/33

(58) Field of Classification Search
CPC .............. G02F 1/134363; G02F 2001/134318; G02F 1/167; G02F 1/1323
USPC .......................................................... 345/212
See application file for complete search history.

(56) References Cited

U.S. PATENT DOCUMENTS

| 2004/0012058 A1* | 1/2004 | Aoki .............................. 257/414 |
| 2008/0150869 A1* | 6/2008 | Hsu .................................. 345/96 |
| 2009/0180172 A1* | 7/2009 | Murakami ..................... 359/296 |
| 2010/0128189 A1* | 5/2010 | Teranishi et al. ................ 349/33 |

FOREIGN PATENT DOCUMENTS

| JP | A-55-6376 | 1/1980 |
| JP | A-11-212499 | 8/1999 |
| JP | A-2000-171839 | 6/2000 |
| JP | A-2002-14382 | 1/2002 |
| JP | A-2004-109612 | 4/2004 |
| JP | A-2007-102148 | 4/2007 |

OTHER PUBLICATIONS

Sep. 3, 2013 Japanese Patent Office Action issued to Japanese Application No. 2010-008478 (with translation).

* cited by examiner

*Primary Examiner* — Gerald Johnson
(74) *Attorney, Agent, or Firm* — Oliff PLC (57) ABSTRACT

The present invention provides a display medium including a pair of substrates; pixel electrodes disposed on one of the pair of substrates; a common electrode disposed on the other substrate of the pair of substrates; and a display layer, the common electrode includes two or more common electrode layers containing a first common electrode layer and a second common electrode layer which being disposed across a gap in a thickness direction, and electrical voltages thereof being controlled independently of each other, the first common electrode layer containing at least one electrode unit and at least one non-electrode area corresponding to a disposition of the pixel electrodes, and the second common electrode layer containing at least one second electrode unit, the at least one second electrode layer completely overlapping with at least the at least one non-electrode area of the first common electrode layer in a thickness direction.

5 Claims, 8 Drawing Sheets

DISPLAY MEDIUM AND DISPLAY APPARATUS

CROSS-REFERENCE TO RELATED APPLICATION

This application is based on and claims priority under 35 USC 119 from Japanese Patent Application No. 2010-008478 filed on Jan. 18, 2010.

BACKGROUND

1. Technical Field

The invention relates to a display medium and a display apparatus.

2. Related Art

As a display medium on which repetitive rewriting is performed, a display medium using electrophoretic particles has been known. This electrophoretic-type display medium is constituted by, for example, including a pair of substrates which respectively include electrode, which are disposed opposingly, and a group of particles which are enclosed between the substrates so as to transfer between the pair of substrates in accordance with an electrical field formed between the pair of substrates.

The group of the particles enclosed between the pair of substrates may be a group of one kind of particles which are colored in a specific color, or may be groups of plural kinds of particles which are different from each other in color and electrical field strength required for transfer. For example, when groups of two kinds of particles are included, the display medium applies an electrical voltage between the pair of substrates to transfer the enclosed particles, whereby displays an image of a color according to the amount of the particles transferred to either side of the substrates and the color of the transferred particles. Namely, by applying an electrical voltage of an intensity for transferring the group of the particles to be transferred between the substrates according to the color and concentration of an image to be displayed, the group of particles to be transferred are transferred to either side of the pair of substrates, whereby an image according to the color and concentration of the image to be displayed is displayed.

SUMMARY

According to an aspect of the invention, there is provided a display medium including a pair of substrates that are oppositely disposed across a first gap, at least one of the substrates having transparency;

pixel electrodes disposed on one of the pair of substrates;

a common electrode that is disposed on the other substrate of the pair of substrates oppositely to the pixel electrode across a second gap, that comprises two or more common electrode layers comprising a first common electrode layer and a second common electrode layer, the first common electrode layer and the second common electrode layer being disposed across a third gap in a thickness direction, and electrical voltages of the first common electrode layer and the second common electrode layer being controlled independently of each other, the first common electrode layer comprising at least one electrode unit and at least one non-electrode area corresponding to a disposition of the pixel electrodes, and the second common electrode layer comprising at least one second electrode unit, the at least one second electrode layer completely overlapping with at least the at least one non-electrode area of the first common electrode layer in a thickness direction; and a display layer that is disposed between the pixel electrodes and the common electrode, which displays in accordance with an electrical field formed between the pixel electrodes and the common electrode.

BRIEF DESCRIPTION OF THE DRAWINGS

Exemplary embodiments of the invention will be described in detail based on the following figures, wherein.

DETAILED DESCRIPTION OF THE INVENTION

Hereinafter the exemplary embodiments are explained with referring to the drawings. Elements which exhibit the same effect and function are provided with the same symbol through the drawings, and overlapping explanations are sometimes omitted. Furthermore, in order to simplify the explanation, the present exemplary embodiment is explained by suitably using a figure which is focused on one cell.

The display medium of the present exemplary embodiment includes a pair of substrates that are oppositely disposed across a first gap, at least one of the substrates having transparency; pixel electrodes disposed on one of the pair of substrates; a common electrode that is disposed on the other substrate of the pair of substrates oppositely to the pixel electrode across a second gap; and a display layer that is disposed between the pixel electrode and the common electrode, which displays in accordance with an electrical field formed between the pixel electrode and the common electrode. The common electrode includes two or more common electrode layers comprising a first common electrode layer and a second common electrode layer, the first common electrode layer and the second common electrode layer being disposed across a third gap in a thickness direction, and electrical voltages of the first common electrode layer and the second common electrode layer being controlled independently of each other, the first common electrode layer comprising at least one electrode unit and at least one non-electrode area corresponding to a disposition of the pixel electrodes, and the second common electrode layer comprising at least one second electrode unit, the at least one second electrode layer completely overlapping with at least the at least one non-electrode area of the first common electrode layer in a thickness direction.

First Exemplary Embodiment

Figure 1:
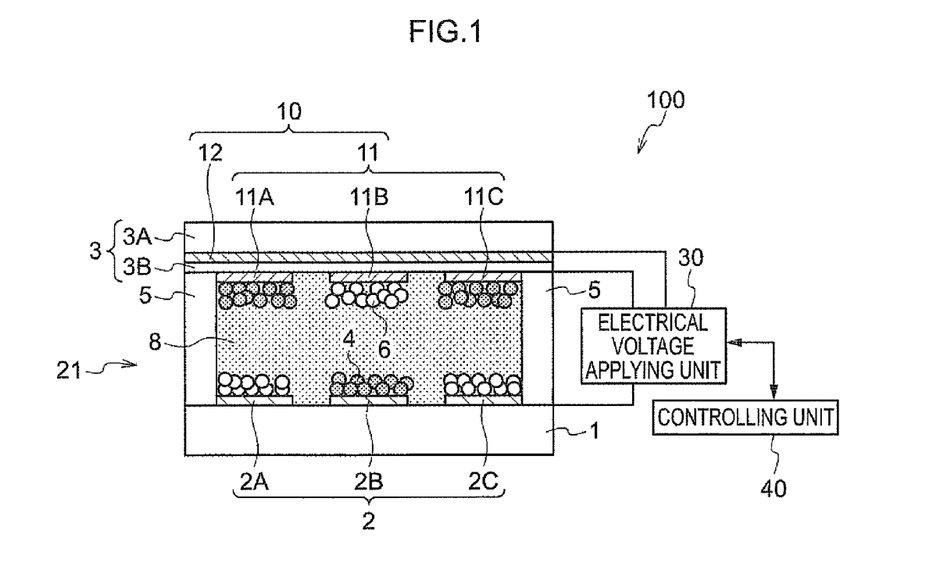
FIG. 1 is a schematic view which shows a display apparatus including a display medium of a first exemplary embodiment.
Figure 2:
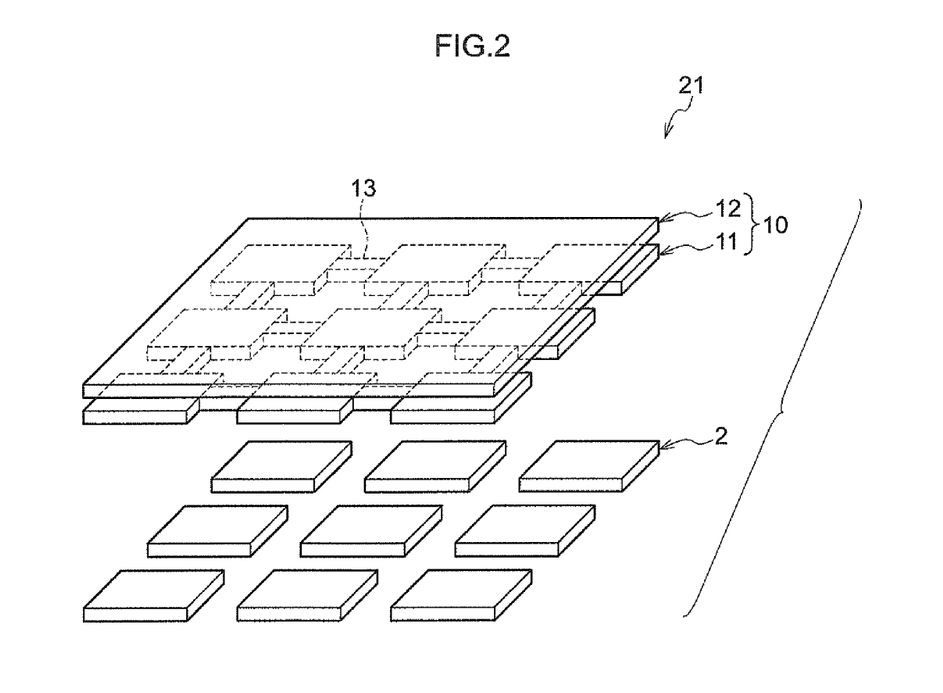
FIG. 2 is a perspective view which schematically shows a disposition of electrodes on the display medium of the first exemplary embodiment.
Figure 3:
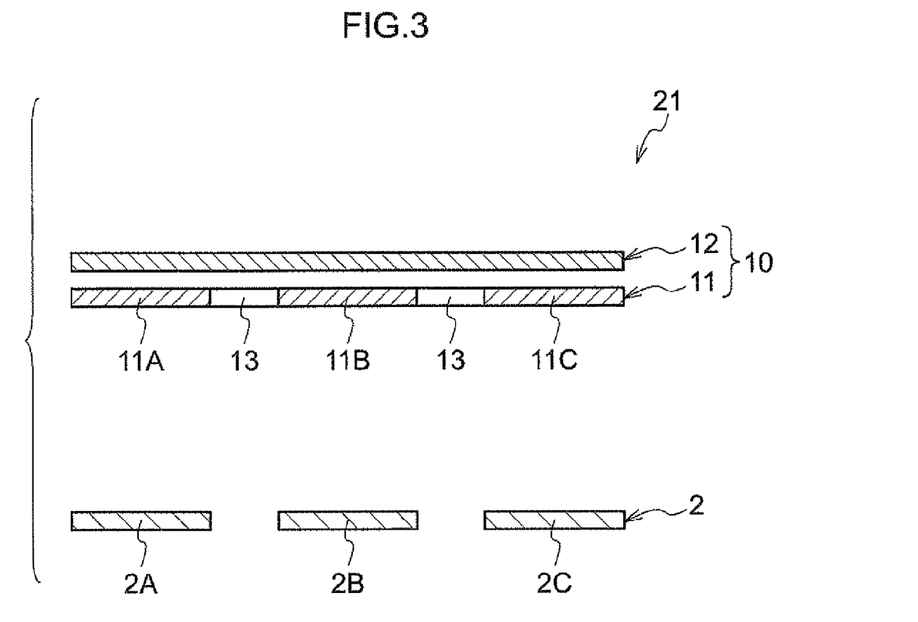
FIG. 3 is a side view which schematically shows the disposition of the electrodes on the display medium of the first exemplary embodiment.

FIG. 1 schematically shows the display apparatus of the first exemplary embodiment. FIGS. 2 and 3 each schematically show the disposition of the electrodes on the display medium of the first exemplary embodiment. In FIGS. 2 and 3, the substrates (display substrate and back surface substrate) on both surfaces and the display layer are omitted.

As shown in FIG. 1, a display apparatus 100 of the first exemplary embodiment includes a display medium 21 which displays by controlling the transfer of two kinds of particles 4 and 6, and an electrical voltage controlling unit (electrical voltage applying unit 30 and controlling unit 40) for controlling an electrical voltage to be applied to the pixel electrodes of the display medium 21 and an electrical voltage to be applied to a common electrode.

In the display medium 21, a display substrate 3 serving as an image display surface and a back surface substrate 1 serving as a non-image display surface are oppositely disposed across a gap.

A gap element 5 retains the gap between these substrates at a predetermined interval, and sections the gap between the substrates into plural cells.

The cell refers to an area which is surrounded by the back surface substrate 1 on which pixel electrodes 2 are disposed, a display substrate 3 on which a common electrode 10 is disposed, and the gap element 5. A transparent dispersion medium 8 and many electrophoretic particles 4 and 6 (suitably described as "migration particles" or "particles") are enclosed in the cell. The migration particles 4 and 6 are dispersed in the dispersion medium 8, and transferred between the substrates of the display substrate 3 and back surface substrate 1 according to an intensity of an electrical field formed in the cell.

The migration particles 6 enclosed in the cell have a predetermined color and are subjected to positive charging treatment, and the migration particles 4 have a different color from that of the migration particles 6 and are subjected to negative charging treatment, and these particles are prepared in advance. For example, white particles having a white color and particles having a color other than white such as black particles are used.

A colored dispersion medium 8 in which one kind of migration particles having a color different from that of the medium are enclosed may be used, or three or more kinds of migration particles having different colors each other may be enclosed in the transparent dispersion medium 8.

Although plural pixel electrodes are disposed in one cell in the present exemplary embodiment, the embodiment is not limited to this. For example, the gap element 5 may be disposed so as to correspond to each pixel when an image is displayed on the display medium and the cell may be formed so as to correspond to each pixel. For example, in the case in which one pixel is displayed by three electrodes of RGB as in color display using a color filter, the present exemplary embodiment is also effective for a one-pixel one-cell structure.

The plural pixel electrodes 2 are disposed in a matrix form on the back surface substrate 1, and these pixel electrodes 2 form respective pixels. The pixel electrodes 2 are respectively connected to TFTs (thin film transistors, not depicted), and an applied electrical voltage is controlled with respect to each pixel electrode.

On the other hand, the common electrode 10 including a first common electrode layer 11 and a second common electrode layer 12 are disposed oppositely to the pixel electrodes 2 across a gap on the display substrate 3. The electrical voltages of the first common electrode layer 11 and the second common electrode layer 12 are controlled independently of each other.

The first common electrode layer 11 includes electrode units (units which constitute pixels together with the pixel electrodes 2) 11A, 11B and 11C and non-electrode areas (portions other than the electrode units) which correspond to the disposition of the pixel electrodes 2, and adjacent electrode units are electrically connected to each other with conducting wires (electrode wires) 13. In the present exemplary embodiment, the "electrode units and non-electrode areas which correspond to the disposition of the pixel electrodes" is not limited to the cases as shown in FIGS. 2 and 3 in which the electrode units 11A, 11B and 11C of the first common electrode layer 11 are present oppositely to the pixel electrodes 2A, 2B and 2C, and the case as shown in the below-mentioned FIG. 8 in which the electrode units 11A and 11B of the first common electrode layer 11 are disposed over regions which respectively include areas opposite to the gaps between the pixel electrodes 2A, 2B and 2C (non-pixel areas) and the non-electrode areas are present oppositely to the pixel electrodes 2A, 2B and 2C is also encompassed.

The second common electrode layer 12 is constituted as an entire-area electrode disposed at a side of the first common electrode layer 11 that is opposite to the pixel electrode 2 side. The second common electrode layer 12 completely overlaps with the entire first common electrode layer 11 in the thickness direction thereof.

The first common electrode layer 11, second common electrode layer 12, and display substrate 3 have each transparency so that an image formed by the migration particles attracted to the side of the first common electrode layer 11 is displayed through these elements. The transparency in the present exemplary embodiment refers to the transmittance of visible light being 60% or more, preferably 80% or more.

On the other hand, the back surface substrate 1 and pixel electrodes 2 disposed at the side of the non-display surface may have or may not have transparency.

When an image is displayed by using the display apparatus 100 of the present exemplary embodiment, an electrical voltage is applied between the pixel electrodes 2 and the common electrode 10, selected based on image data by the electrical voltage applying unit 30 and the controlling unit 40 which constitute the electrical voltage controlling unit, and the particles 4 and 6 are attracted separately to either the common electrode or pixel electrodes with respect to each pixel according to an electrical field formed between these electrodes 2 and 10. Accordingly, an arbitral image is displayed by controlling the particles to be attracted to the common electrode with respect to each pixel. Furthermore, when one kind of the particles is attracted to the side of the common electrode and another kind of particles are attracted to the side of the pixel electrodes respectively, display of one color on the entire surface is realized.

Here, the electrical fields formed in a conventional display medium and the display medium of the present exemplary embodiment, and the dispositions of the particles are specifically explained.

FIGS. 11 to 14 schematically show the dispositions of the electrodes in two kinds of conventional display media. The black particles 4 are positively charged and the white particles 6 are negatively charged in FIG. 12, whereas the black particles 4 are negatively charged and the white particles 6 are positively charged in FIG. 14.

Figure 11:
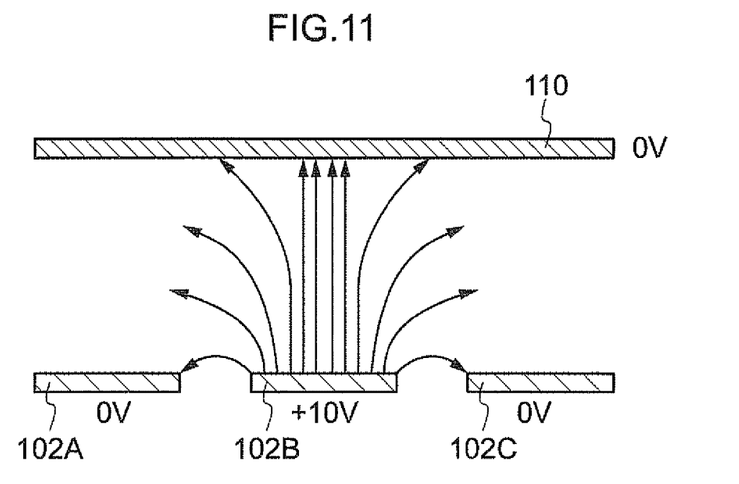
FIG. 11 is a schematic view which shows an example of an electrical field formed when an image is displayed on a conventional display medium.
Figure 12:
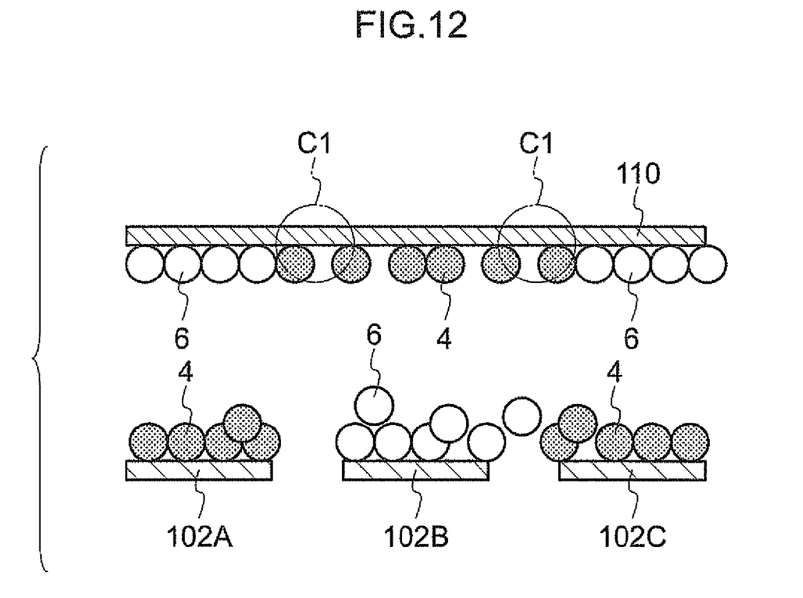
FIG. 12 is a schematic view which shows an example of a disposition of particles when an image is displayed on the conventional display medium.

For example, when an image is to be displayed on the display medium on which an entire-area electrode is disposed as a common electrode 110 as shown in FIG. 11, in the case in which 0 V is applied to all of pixel electrodes 102 and +10 V is applied to the common electrode 110 to achieve white display on the entire surface at first, and an electrical voltage of 0 V is applied to pixel electrodes 102A and 102C, 10V is applied to the pixel electrode 102B, and 0 V is applied to the common electrode 110, an electrical field which is also extended to the circumference of the pixel electrode 102B is formed between the pixel electrode 102B and common electrode 110 as is schematically shown by electrical flux lines in FIG. 11. Therefore, as shown in FIG. 12, the black particles 4 subjected to image display are attracted to the areas (areas surrounded by C1) which are broader than the area opposing to the pixel electrode 10213 on the common electrode 110, and thus the pixel is broaden and tends to be unclear. Specifically, in an electron paper utilizing electrophoresis, the distance between the pixel electrodes and common electrode is long and the electrical field (pixel) tends to be broadened.

Figure 13:
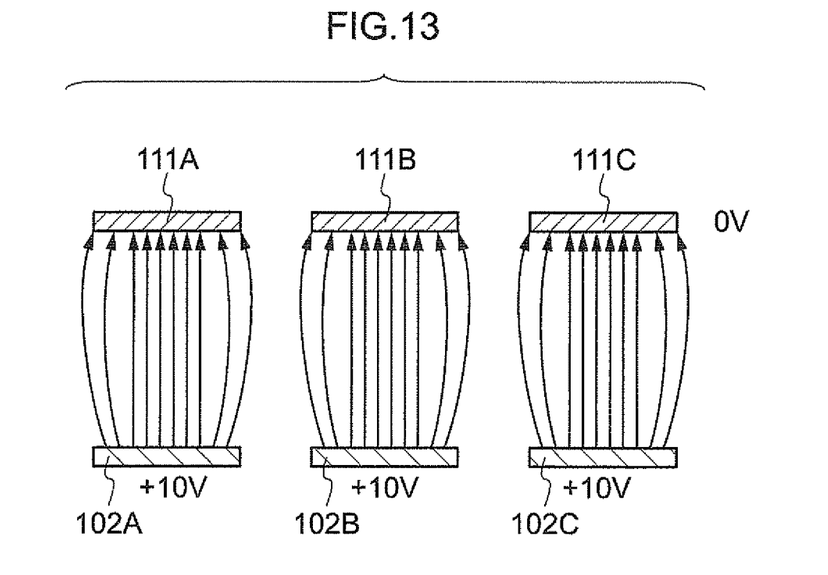
FIG. 13 is a schematic view which shows an example of an electrical field formed when white display is carried out on the conventional display medium.
Figure 14:
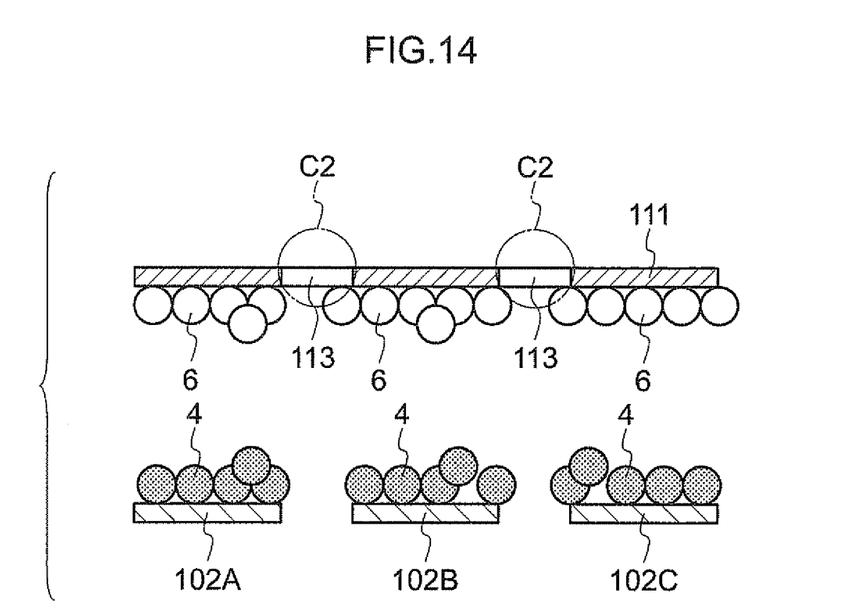
FIG. 14 is a schematic view which shows an example of the disposition of the particles when white display is carried out in the conventional display medium.

As shown in FIG. 13, in a display medium wherein the common electrode including electrode units 111A, 111B and 111C which correspond to the pixel electrodes is disposed opposite to the pixel electrodes 102A, 102B and 102C, and the adjacent electrode units are connected by conducting wires 113, when an electrical voltage is applied to the pixel electrodes 102A, 102B and 102C by 10 V, and on the common electrode 111 by 0 V, as shown by the electrical flux lines, the spreading of the electrical fields formed between the respective pixel electrodes 102A, 102B and 1020 and the opposing common electrodes 111A, 111B and 111C is suppressed. In this display medium, the resolution of image display is more improved than the display medium shown in FIG. 12. However, as shown in FIG. 14, since the particles are not attracted to the non-electrode areas (areas surrounded by C2) on the common electrode 111, when one color is displayed on the entire surface, for example, white display is achieved, the display density is decreased due to deletion of the particles between the pixels, and the pattern between the pixels inevitably appears.

On the other hand, in the display medium 21 of the present exemplary embodiment, the particles between the pixels are also controlled, whereby a high resolution and a high image density are realized.

Figure 4:
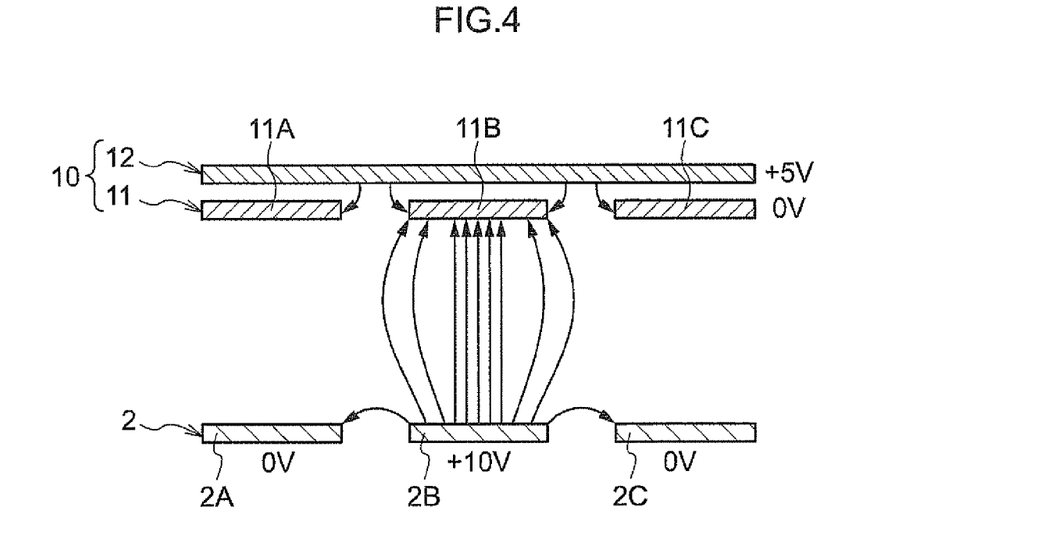
FIG. 4 is a schematic view which shows an example of an electrical field formed when an image is displayed on the display medium of the first exemplary embodiment.
Figure 5:
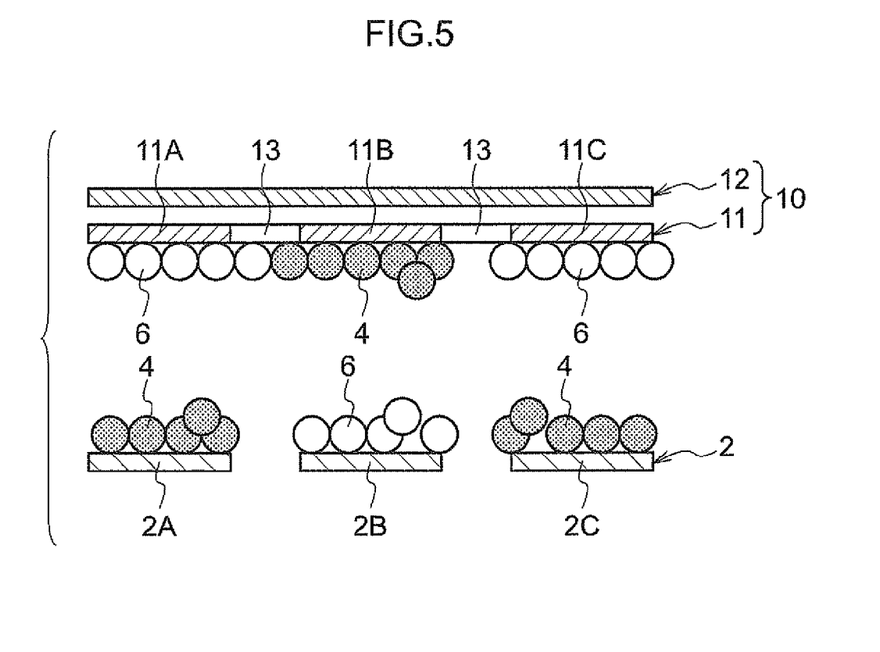
FIG. 5 is a schematic view which shows an example of a disposition of particles during image display on the display medium of the first exemplary embodiment.

In the display medium of the present exemplary embodiment, when an image is displayed by two kinds of the particles 4 and 6 (the particles 4 are positively charged and the particles 6 are negative charged) at first, 0 V is applied to all of the pixel electrodes 2 and +10 V is applied to the common electrodes 11 and 12 to achieve white display on the entire surface, and thereafter an electrical voltage of 0 V is applied to the pixel electrodes 2A and 2C, 10 V is applied to the pixel electrode 2B, 0 V is applied to the first common electrode layer 11 and 5 V is applied to the second common electrode layer 12 as shown in FIG. 4, the spreading of the electrical field in the pixel area is suppressed. Therefore, as shown in FIG. 5, also on the common electrode, the particles 4 are attracted with respect to each of the areas (pixel areas) which are opposed to the respective pixel electrodes 2A, 2B and 2C. Namely, since disposition of the particles between the pixels are suppressed, the pixels are sharply reproduced and a high contrast is achieved.

The electrical voltages to be applied to the respective electrodes 2, 11 and 12 are not limited to the above-mentioned values, and may be suitably selected according to the electric properties of the particles 4 and 6, the distance between the pixel electrodes 2 and the common electrode 10, and the distance between the first common electrode layer 11 and the second common electrode layer 12, and the like. However, in view of suppression of the spreading of the pixels, it is preferable to adjust the electrical potential difference between the pixel electrodes 2 and the first common electrode layer 11 (10 V in FIG. 4) to be higher than the electrical potential difference between the pixel electrodes 2 and the second common electrode layer 12 (5 V in FIG. 4).

Figure 6:
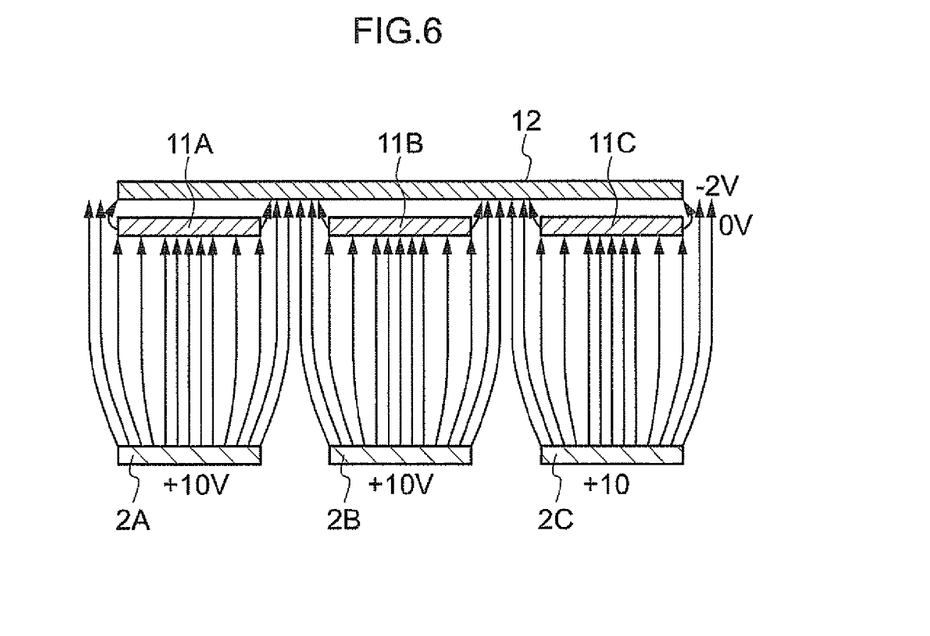
FIG. 6 is a schematic view which shows an example of an electrical field formed when white display is carried out on the display medium of the first exemplary embodiment.
Figure 7:
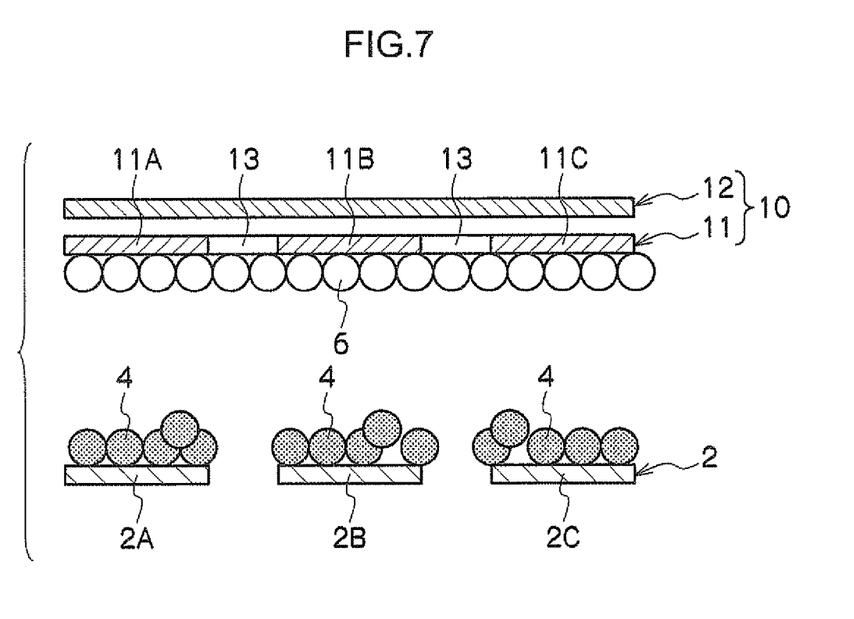
FIG. 7 is a schematic view which shows an example of the disposition of the particles when white display is carried out on the display medium of the first exemplary embodiment.

When one color is displayed on the entire surface, for example, white display is to be achieved on the display medium 21 of the present exemplary embodiment, for example, as shown in FIG. 6, when an electrical voltage of 10 V is applied to the pixel electrodes 2A, 2B and 2C, 0 V is applied to the first common electrode layer 11, and −2V is applied to the second common electrode layer 12, the electrical fields formed between the pixel electrodes 2 and common electrode 10 are also extended to the non-electrode areas between the electrode units as well as the electrode units 11A, 11B and 11C of the first common electrode layer 11. Therefore, when the white particles 6 are positively charged and the black particles 4 are negatively charged, the particles 6 are disposed on the entirety of the first common electrode layer 11 as shown in FIG. 7, whereby deletion of the particles 6 between the pixels is suppressed. Namely, decrease in the image density is more suppressed as compared to a display medium including a common electrode which does not include the second common electrode layer 12.

Also in the case in which white display is to be achieved on the entire surface, the electrical voltages applied to the respective electrodes 2, 11 and 12 are not limited to the above-mentioned values, and may be suitably selected according to the electric properties of the particles 4 and 6, the distance between the pixel electrodes 2A, 2B and 2C and the common electrode 10, the distance between the first common electrode layer 11 and the second common electrode layer 12, and the like. However, in view of that the particles are certainly attracted to the non-electrode areas of the first common electrode layer 11, namely, between the pixels, it is preferable to control the electrical potential difference between the pixel electrodes 2 and the second common electrode layer 12 (12 V in FIG. 6) to be higher than the electrical potential difference between the pixel electrodes 2 and the first common electrode layer 11 (10 V in FIG. 6).

The distance between the pixel electrodes 2 and the first common electrode layer 11 is, for example, from 10 μm to 100 μm so that the particles disposed between these electrodes can be transferred to either side of each electrode by applying an electrical voltage.

On the other hand, the smaller the gap between the first common electrode layer 11 and the second common electrode layer 12 is, the better an effect of controlling the electrical field by the second common electrode layer 12 at a low electrical voltage is. In view of the control of the electrical field by the second common electrode layer 12, the gap is, for example, from 0.1 μm to 10 μm.

Second, the constitutional elements of the display apparatus of the present exemplary embodiment are explained more specifically.

Display Substrate and Back Surface Substrate

The first common electrode layer 11 and second common electrode layer 12 are disposed as the common electrode 10 on the display substrate 3.

The pixel electrodes 2 are disposed on the back surface substrate 1.

The display substrate 3, or both the display substrate 3 and the back surface substrate 1 have transparency.

Examples of materials for the display substrate 3 and the back surface substrate 1 may include glass, plastics such as polyethylene telephthalate resins, polycarbonate resins, acrylic resins, polyimide resins, polyester resins, epoxy resins and polyethersulfone resins, and the like.

The thickness of each of the display substrate 3 and the back surface substrate 1 is, for example, from 50 μm to 3 mm. Since the back surface substrate 1 includes a TFT, it is thicker than the display substrate 3. For example, the display substrate 3 is adjusted to from 0.05 mm to 1 mm, and the back surface substrate 1 is adjusted to from 0.1 mm to 3 mm.

Pixel Electrode

The pixel electrodes 2 are disposed on the back surface substrate 1 in a specific pattern, for example, in the form of a matrix, and each of which forms a pixel. The pixel electrodes 2A, 2B and 2C are respectively connected to TFTs (not depicted), and an electrical voltage is controlled with respect to each of the pixel electrodes 2A, 2B and 2C.

For the pixel electrodes 2, oxides of indium, tin, cadmium, antimony and the like, composite oxides such as ITO, metals such as gold, silver, copper and nickel, organic materials such as polypyrrole and polythiophene, and the like are used. These are used as a monolayer film, a mixed film or a composite film, and formed by a deposition process, a spattering process, a coating process or the like.

The thickness of each pixel electrode 2 is generally from 100 Å (Angstrom) to 2000 Å by a deposition process or a spattering process.

When the display apparatus is to be driven by passive matrix driving, the electrodes may be formed in the form of stripes.

Alternatively, the pixel electrodes may be embedded in the back surface substrate.

Common Electrode

The common electrode 10 includes the first common electrode layer 11 and the second common electrode layer 12, and the first common electrode layer 11 and the second common electrode layer 12 are disposed across a gap in the thickness direction.

A gap element 3B which forms a part of the display substrate and retains the gap between the first common electrode layer 11 and the second common electrode layer 12 is disposed between the first common electrode layer 11 and the second common electrode layer 12. The gap element 3B may be formed as a dielectric layer having a specific thickness, for example, after forming the second common electrode layer 12 on the display substrate 3A. Then, the first common electrode layer 11 may be formed in a specific pattern on the dielectric layer 3B.

In the first common electrode layer 11, the electrode units 11A, 11B and 11C having a similar shape to that of the pixel electrodes 2 are disposed in the form of a matrix with respect to the surface of the surface substrate so as to be disposed at areas opposite to the respective pixel electrodes 2A, 2B and 2C. The adjacent electrode units are conducted each other with the conducting wires (electrode wires) 13, whereby a common electrical voltage is applied thereto. In the present exemplary embodiment, the electroconductive layer which is opposite to the pixel electrodes 2A, 2B and 2C and to which the particles are attracted on the first common electrode layer 11 is defined as the electrode units 11A, 11B and 11C, and the areas other than the electrode units, including the areas on which the conducting wires 13 are disposed, is defined as the non-electrode areas.

The second common electrode layer 12 is an entire-area electrode formed on the entire surface of the display substrate, and a common electrical voltage is applied thereto.

Materials and thicknesses which provide light permeability are adopted for both of the first common electrode layer 11 and the second common electrode layer 12.

For the respective common electrode layers 11 and 12, oxides of indium, tin, cadmium and antimony, composite oxides such as ITO and IZO, metals such as gold, silver, copper and nickel, organic materials such as polypyrrole and polythiophene, and the like are used. These are used as a monolayer film, a mixed film or a composite film, and formed by a deposition process, a spattering process, a coating process or the like.

The thickness of the first common electrode layer 11 is generally from 100 Å to 2000 Å by a deposition process or a spattering process.

The thickness of the second common electrode layer 12 is generally from 100 Å to 2000 Å by a deposition process or a spattering process.

Gap Element

The gap element 5 for retaining the gap between the display substrate 3 and the back surface substrate 1 is formed so that the transparency of the display substrate 3 is not impaired, for example, formed by a thermoplastic resin, a thermosetting resin, an electron beam-curable resin, a photocurable resin, a rubber or the like.

The gap element 5 may be integrated in one of the display substrate 3 and the back surface substrate 1. In this case, the gap element is formed by subjecting the substrate 1 or 3 to an etching treatment, a laser processing treatment, a press processing treatment using a mold prepared in advance or a printing treatment using.

The gap element 5 is formed on either of the display substrate 3 and the back surface substrate 1, or both.

Although the gap element 5 may have a color or may be colorless, it is preferably colorless and transparent so as to not adversely affect a display image displayed on the display medium. For example, transparent resins such as polystyrenes, polyesters and acrylic resins, and the like are used.

When a particulate or spherical gap element 5 is adopted, it is also preferably transparent. Particles of transparent resins such as polystyrenes, polyesters and acrylic resins, as well as glass particles are used.

In the present exemplary embodiment, the "transparent" means that a transmittance is 60% or more with respect to visible light.

Dispersion Medium

As for the dispersion medium 8 to which the migration particles 4 and 6 are to be dispersed, an insulating liquid is preferable. In the present specification, the term "insulating" refers that a volume intrinsic resistance is $10^{11}$ Ωcm or more.

Preferable examples of the insulating liquid may include hexane, cyclohexane, toluene, xylene, decane, hexadecane, kerosene, paraffin, isoparaffin, silicone oil, dichloroethylene, trichloroethylene, perchloroethylene, high purity petroleum, ethylene glycol, alcohols, ethers, esters, dimethylformamide, dimethylacetamide, dimethylsulfoxide, N-methylpyrrolidone, 2-pyrrolidone, N-methylformamide, acetonitrile, tetrahydrofuran, propylenecarbonate, ethylenecarbonate, benzine, diisopropylnaphthalene, olive oil, isopropanol, trichlorotrifluoroethane, tetrachloroethane, dibromotetrafluoroethane and the like, and mixtures thereof. Of these, silicone oil is preferably used.

Where necessary, an acid, an alkali, a salt, a dispersion stabilizer, stabilizers for the purpose of preventing oxidation, absorbing ultraviolet ray and the like, an antibiotic, an antiseptic, and the like may be added to the insulating liquid, and they are preferably added so that a value of volume intrinsic resistance falls within the above-mentioned specific range.

Furthermore, an anionic surfactant, a cationic surfactant, an amphoteric surfactant, a nonionic surfactant, a fluorine-based surfactant, a silicone-based surfactant, a metal soap, alkylphosphate esters, succinic acid imides and the like may be added as a charge controlling agent to the insulating liquid prior to use.

More specific examples of the ionic and nonionic surfactants may include the following ones. Examples of the nonionic surfactant may include polyoxyethylene nonyl phenyl ether, polyoxyethylene octyl phenyl ether, polyoxyethylene dodecyl phenyl ether, polyoxyethylene alkyl ether, polyoxyethylene aliphatic acid ester, sorbitan aliphatic acid ester, polyoxyethylene sorbitan aliphatic acid ester, aliphatic acid alkylolamide and the like. Examples of the anion surfactant may include alkylbenzene sulfonates, alkyl phenyl sulfonates, alkyl naphthalene sulfonates, salts of higher aliphatic acid, sulfuric acid ester salts of higher aliphatic acid esters and sulfonic acid salts of higher aliphatic acid esters. Examples of the cation surfactant may include primary to tertiary amine salts and quaternary ammonium salts.

These charge controlling agents are incorporated by preferably from 0.01% by weight to 20% by weight, specifically preferably by from 0.05% by weight to 10% by weight with respect to the solid content of the particles.

In the dispersion medium 8, the insulating liquid may be used in combination with a polymer resin. As the polymer resin, polymer gels, high molecular weight polymers and the like are also preferable.

Examples of the specific polymer resin may include polymer gels derived from natural polymers such as agarose, agaropectin, amylose, sodium alginate, alginic acid propylene glycol ester, isolichenan, insulin, ethyl cellulose, ethylhydroxyethyl cellulose, curdlan, casein, carrageenan, carboxymethyl cellulose, carboxymethyl starch, callose, agar, chitin, chitosan, silk fibroin, guar gum, quince seed, crown gall polysaccharide, glycogen, glucomannan, keratan sulfate, keratin protein, collagen, cellulose acetate, gellan gum, schizophyllan, gelatin, vegetable ivory mannan, tunicin, dextran, dermatan sulfate, starch, tragacanth gum, nigeran, hyaluronic acid, hydroxyethyl cellulose, hydroxypropyl cellulose, pustulan, funoran, decomposed xyloglucan, pectin, porphyran, methyl cellulose, methyl starch, laminaran, lichenan, lentinan and locust bean gum, as well as almost all polymer gels derived from synthesis polymers.

Furthermore, the examples may include polymers including functional groups such as alcohol, ketone, ether, ester and amide in repeating units, and examples thereof may include, polyvinyl alcohol, poly(meth)acrylamide and derivatives thereof, polyvinyl pyrrolidone, polyethylene oxide, and copolymers including these polymers.

Among these, gelatin, polyvinylalcohol, poly(meth)acrylamide and the like are preferably used.

Furthermore, a color which is different from the colors of the migration particles 4 and 6 may be displayed by incorporating a colorant into the dispersion medium 8.

Examples of the colorant to be incorporated into the dispersion medium 8 may include known colorants such as carbon black, titanium oxide, magnesium oxide, zinc oxide, phthalocyanine copper-based cyan colorants, azo-based yellow colorants, azo-based magenta colorants, quinacridone-based magenta colorants, red colorants, green colorants and blue colorants. Specific typical examples may include Aniline Blue, Carcoyl Blue, Chromium Yellow, Ultramarine Blue, DuPont Oil Red, Quinoline Yellow, Methyleneblue Chloride, Phthalocyanine Blue, Malachite Green Oxalate, Lamp Black, Rose Bengal, C. I. Pigment Red 48:1, C. I. Pigment Red 122, C. I. Pigment Red 57:1, C. I. Pigment Yellow 97, C. I. Pigment Blue 15:1, C. I. Pigment Blue 15:3 and the like.

It is preferable that the dispersion medium 8 has a low viscosity since the migration particles 4 and 6 are transferred therein. Therefore, it is preferable that the viscosity of the dispersion medium 8 is also adjusted.

The viscosity of the dispersion medium 8 is preferably from 0.1 mPa·s to 100 mPa·s, more preferably from 0.1 mPa·s to 50 mPa·s, and further preferably from 0.1 mPa·s to 20 mPa·s under environmental condition of 20° C.

The viscosity of the dispersion medium 8 is adjusted by adjusting the molecular weight, structure, composition and the like of the dispersion medium. For the measurement of the viscosity, B-8L Viscometer (manufactured by Tokyo Keiki Inc.) is used.

Migration Particles

In the present exemplary embodiment, for example, the migration particles 6 are positively (+) charged and the migration particles 4 are negatively (−) charged, and are transferred in the dispersion medium 8 when a specific electrical voltage is applied to between the electrodes of the common electrode 10 and the pixel electrodes 2 (namely, between the display substrate 3 and the back surface substrate 1) to form an electrical field not less than a specific electrical field intensity between the substrates of the display substrate 3 and the back surface substrate 1.

The change in the displayed color in the display medium is caused by the transfer of the particles which constitute the migration particles 4 and 6 in the dispersion medium 8.

Examples of the migration particles 4 and 6 may include insulating metal oxide particles such as glass beads, alumina and oxide titanium oxide, thermoplastic or thermosetting resin particles, these resin particles wherein a colorant is fixed on the surfaces thereof, particles including a colorant in a thermoplastic or thermosetting resin, metal colloid particles having the color strength due to the surface plasmon resonance, and the like.

Examples of the thermoplastic resin used for the production of the particles may include homopolymers or copolymers of styrenes such as styrene and chlorostyrene; monoolefins such as ethylene, propylene, butylene and isoprene; vinylesters such as vinyl acetate, vinyl propionate, vinyl benzoate and vinyl butyrate; α-methylenealiphaticmonocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone.

Examples of the thermosetting resin used for the production of the particles may include crosslinked resins such as crosslinked copolymers including divinylbenzene as a main component and crosslinked polymethylmethacrylate, phenol resins, urea resins, melamine resins, polyester resins, silicone resins and the like. Examples of the specific typical binder resin may include polystyrenes, styrene-acrylic acid alkyl copolymers, styrene-methacrylic acid alkyl copolymers, styrene-acrylonitrile copolymers, styrene-butadiene copolymers, styrene-maleic anhydride copolymers, polyethylenes, polypropylenes, polyesters, polyurethanes, epoxy resins, silicone resins, polyamides, modified rosins, paraffin waxes and the like.

As the colorant, organic or inorganic pigments, oil-soluble dyes and the like are used, and typical examples may include magnetic powders such as magnetite and ferrite, and known colorants such as carbon black, titanium oxide, magnesium oxide, zinc oxide, phthalocyanine copper-based cyan colorants, azo-based yellow colorants, azo-based magenta colorants, quinacridone-based magenta colorants, red colorants, green colorants and blue colorants. Specific examples may include Aniline Blue, Carcoyl Blue, Chromium Yellow, Ultramarine Blue, DuPont Oil Red, Quinoline Yellow, Methyleneblue Chloride, Phthalocyanine Blue, Malachite Green Oxalate, Lamp Black, Rose Bengal, C. I. Pigment Red 48:1, C. I. Pigment Red 122, C. I. Pigment Red 57:1, C. I. Pigment Yellow 97, C. I. Pigment Blue 15:1, C. I. Pigment Blue 15:3 and the like.

Where necessary, a charge controlling agent may be incorporated in the resin for the particles. As the charge controlling agent, known agents used for materials for electrophotographic toner are used, and examples thereof may include quaternary ammonium salts such as cetyl pyridyl chloride, and BONTRON P-51, BONTRON P-53, BONTRON E-84 and BONTRON E-81 (trade names, manufactured by Orient Chemical Industries, Co., Ltd.), salicylic acid-based metal complexes, phenol-based condensates, tetraphenyl-based compounds, metal oxide particles, and metal oxide particles subjected to surface treatment with various coupling agents.

Where necessary, an external additive may be attached to the surfaces of the particles. The color of the external additive is preferably transparent so as not to affect the color of the particles.

As the external additive, inorganic particles of metal oxides such as silicon oxide (silica), titanium oxide and alumina are used. The particles may be subjected to a surface treatment with a coupling agent or a silicone oil.

The coupling agent includes positively charged ones such as aminosilane-based coupling agents, aminotitanium-based coupling agents and nitrile-based coupling agents, and negatively charged ones such as nitrogen atom-free (constituted by atoms other than nitrogen) silane-based coupling agents, titanium-based coupling agents, epoxy silane coupling agents and acrylsilane coupling agents. The silicone oil includes positively charged ones such as amino-modified silicone oils, and negatively charged ones such as dimethylsilicone oils, alkyl-modified silicone oils, α-methylsulfone-modified silicone oils, methylphenylsilicone oils, chlorophenylsilicone oils and fluorine-modified silicone oils. These are selected according to the resistance of the external additive.

Among the external additives, well-known hydrophobic silica and hydrophobic titanium oxide are preferable, and the titanium compound obtained by a reaction of TiO $(OH)_2$ and a silane compound such as a silane coupling agent described in JP-A No. 10-3177 is specifically preferable. As the silane compound, any type of chlorosilanes, alkoxysilanes, silazanes and special silylation agents may be used. The titanium compound is prepared by reacting $TiO(OH)_2$ which is prepared by a wet process with a silane compound or a silicone oil, followed by drying.

The primary particle size of the external additive is, but is not limited to, generally from 1 nm to 100 nm, more preferably from 5 nm to 50 nm.

The incorporation ratio of the external additive and the particles is adjusted according to the balance between the particle size of the particles and the particle size of the external additive. The amount of the external additive is generally from 0.01 parts by weight to 3 parts by weight, preferably from 0.05 parts by weight to 1 part by weight with respect to 100 parts by weight of the particles.

The external additive may be added to any one of, plural or all kinds of particles. When the external additive is added to the surfaces of all of the particles, it is preferable to knock the external additive on the surfaces of the particles with an impact force, or to heat the surfaces of the particles to tightly attach the external additive on the surfaces of the particles.

The content of the migration particles 4 and 6 (content with respect to the total weight in the cell (% by weight)) are not specifically limited so long as the concentration gives a required color hue, and it is effective as a display medium to adjust the content by the thickness of the cell (namely, the distance between the substrates of the display substrate 3 and the back surface substrate 1). Namely, the thicker the cell is so as to obtain the above-mentioned color hue, the smaller the content is, or the thinner the cell is, the more the content is. Generally, the content is from 0.01% by weight to 50% by weight.

The unit for fixing the display substrate 3 on which the common electrode 10 is disposed and the back surface substrate 1 on which the pixel electrodes 2 are disposed each other via the gap element 5 is not specifically limited, and for example, fixing unit such as a combination of bolts and nuts, a clamp, a clip and a frame for fixing substrates are used. Alternatively, fixing unit such as an adhesive, heat melting and ultrasonic junction may also be used.

The thus-constituted display medium 21 is used for, for example, bulletin boards, circulars, electronic chalkboards, advertising boards, nameboards, flashing signs, electronic papers, electronic newspapers, electronic books, document sheets which are commoditized with copying machines and printers, and the like, on which images are retained and rewritten.

Electrical voltage applying unit and Controlling Unit

The electrical voltage applying unit 30 is electrically connected to the pixel electrodes 2, and to the first common electrode layer 11 and the second common electrode layer 12 of the common electrode 10, respectively. Although both of the common electrode 10 and pixel electrodes 2 are electrically connected to the electrical voltage applying unit 30 in the present exemplary embodiment, a constitution in which either of the first common electrode layer 11 and the second common electrode layer 12 is grounded and the other common electrode layer and the pixel electrodes 2 are connected to the electrical voltage applying unit 30 may also be used.

The electrical voltage applying unit 30 is connected to the controlling unit 40 so that signals are sent and received.

The controlling unit 40 may also be constituted as a microcomputer including a CPU (central processing unit) which controls the operations of the entirety of the device, a RAM (Random Access Memory) which temporarily stores various data, and a ROM (Read Only Memory) in which various programs such as a control program which controls the entirety of the device have been stored in advance.

The electrical voltage applying unit 30 is an electrical voltage applying device for applying an electrical voltage to the common electrode 10 and pixel electrodes 2, which applies an electrical voltage according to the control of the controlling unit 40 to the pixel electrodes 2 and the first common electrode layer 11 and second common electrode layer 12 of the common electrode 10, respectively.

In the case in which a single color is displayed on the entire surface by either of the particles 4 and 6, the electrical voltage controlling unit which is constituted by the electrical voltage applying unit 30 and the controlling unit 40 applies an electrical voltage by which the second common electrode layer 12 attracts the one of the particles more than the first common electrode layer 11 does, or in the case in which an image is displayed by the other particles, the electrical voltage controlling unit applies an electrical voltage by which the first common electrode layer 11 attracts the other particles more than the second common electrode layer 12 does, whereby an arbitrary image is displayed.

For example, in the case in which white particles 6 and black particles 4 as color particles other than white are included as the electrophoretic particles, when white display is to be achieved by the white particles 6, the electrical voltage controlling unit (the electrical voltage applying unit 30 and the controlling unit 40) applies an electrical voltage by which the second common electrode layer 12 attracts the white particles 6 more than the first common electrode layer 11 does. Thus, as shown in FIG. 7, deletion of the particles between the pixels is suppressed, whereby a high image density is realized. In this case, the black particles 4 are negatively charged and the white particles 6 are positively charged. Next, when an image is to be displayed by the black particles 4, an electrical voltage by which the first common electrode layer 11 attracts the black particles 4 more than the second common electrode layer 12 does is applied. Thus, the disposition of the particles between the pixels is suppressed as shown in FIG. 5, whereby the spreading of the pixels by the black particles is suppressed and an image is displayed clearly.

Second Exemplary Embodiment

Figure 8:
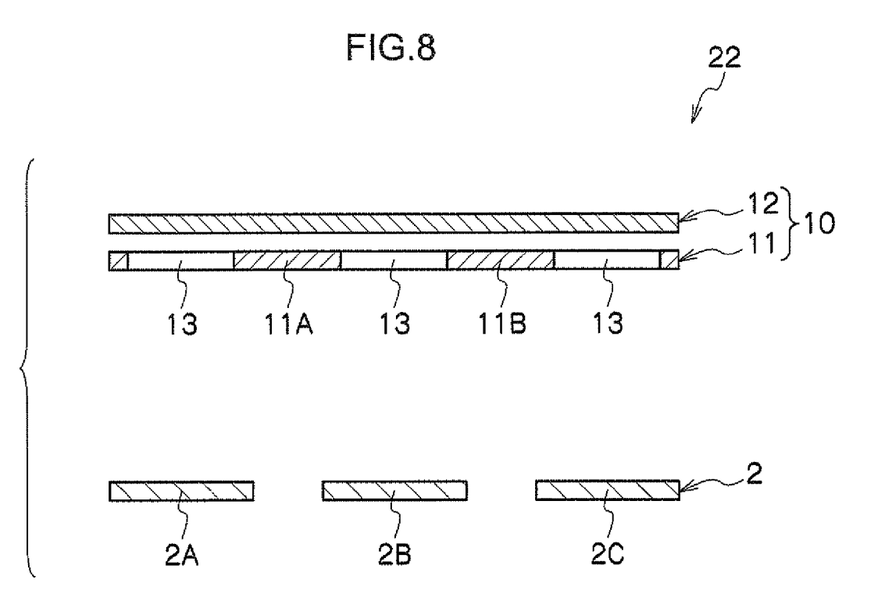
FIG. 8 is a perspective view which schematically shows a disposition of electrodes in a display medium of a second exemplary embodiment.

FIG. 8 schematically shows the disposition of the electrodes in the display medium of the second exemplary embodiment. In a display medium 22 of the second exemplary embodiment, the pixel electrodes 2 are disposed in a similar shape to that in the display medium 21 of the first exemplary embodiment.

On the other hand, for the common electrode, in the first common electrode layer 11, the electrode units 11A and 11B are disposed over regions which respectively include areas opposite to the gaps between the adjacent pixel electrodes, and the areas opposite to the pixel electrodes 2A, 2B and 2C are mainly non-electrode areas. The adjacent electrode units are electrically connected to each other with the conducting wires 13 as in the display medium of the first exemplary embodiment. Furthermore, the second common electrode layer 12 is disposed as an entire-area electrode as in the display medium of the first exemplary embodiment. Electrical voltages are independently controlled for the first common electrode layer 11 and second common electrode layer 12.

Also in this display medium 22, since the second common electrode layer 12 overlaps with the non-electrode areas of the first common electrode layer 11 in the thickness direction, the disposition of the particles is controlled at a high accuracy by controlling the electrical voltages to be applied to the first common electrode layer 11 and the second common electrode layer 12, as compared to the case in which the display medium has either of the common electrode layers.

For example, as in the display medium of the first exemplary embodiment shown in FIG. 6, when an electrical voltage of 10 V is applied to the pixel electrodes 2A, 2B and 2C, 0 V is applied to the first common electrode layers 11A and 11B, and −2V is applied to the second common electrode layer 12, electrical fields are formed between the pixel electrode 2B and the electrode unit 11B of the first common electrode layer 11, and between the pixel electrode 2B and portions of the second common electrode layer 12 which respectively overlap with the non-electrode areas of the first common electrode layer 11, whereby the white particles are attracted to the entire surface of the common electrode 10, and white display on the entire surface with a high density is realized. The electrical voltages applied to the respective electrodes 2, 11 and 12 are not limited to the above-mentioned values, and are suitably selected according to the electric properties of the particles 4 and 6, the distance between the pixel electrodes 2 and the common electrode 10, the distance between the first common electrode layer 11 and the second common electrode layer 12, and the like.

Furthermore, for example, by controlling the electrical voltage so as to provide a specific electrical potential difference between the pixel electrode 2B of the pixel electrodes 2A, 2B and 2C and the second common electrode layer 12, and by controlling the electrical voltage so as to provide a specific electrical potential difference between the first common electrode layer 11 and the second common electrode layer 12, the spreading of the electrical field in each pixel unit is suppressed in a similar manner as shown in FIGS. 4 and 5, whereby the pixels are clearly reproduced, and a high contrast is achieved.

For example, when the black particles are positively charged and the white particles are negatively charged, and an image is displayed from a preceding state of white display on the entire surface, 0 V is applied to the pixel electrodes 2A and 2C, 10 V is applied to the pixel electrode 2B, 5 V is applied to the first common electrode layer 11, and 0 V is applied to the second common electrode layer 12. In the present exemplary embodiment as well, decrease in the image density is suppressed more as compared to a display medium including a common electrode which does not include the second common electrode layer 12.

Third Exemplary Embodiment

Figure 9:
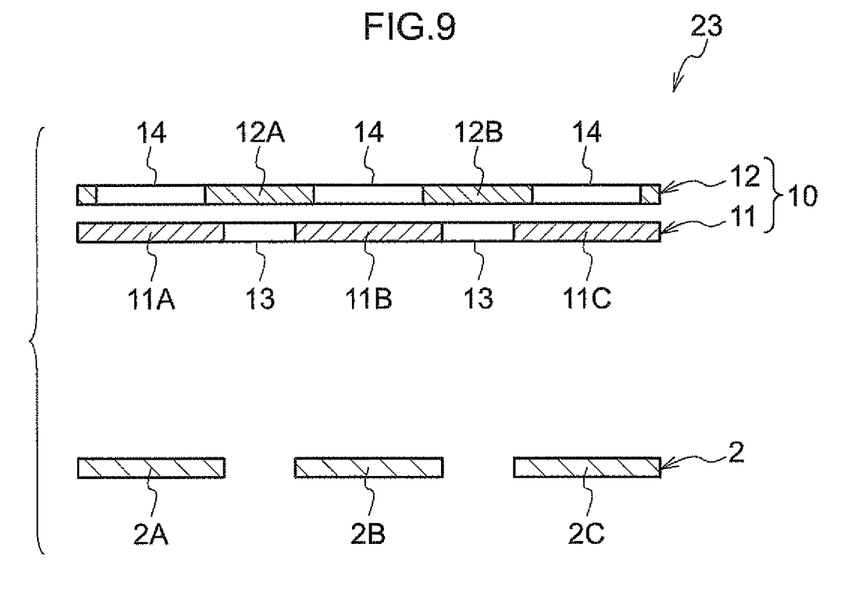
FIG. 9 is a perspective view which schematically shows a disposition of electrodes in a display medium of a third exemplary embodiment.

FIG. 9 schematically shows the disposition of the electrodes in the display medium of the third exemplary embodiment. In a display medium 23 of the third exemplary embodiment, the pixel electrodes 2 and the first common electrode layer 11 are disposed in similar shapes to those in the display medium of the first exemplary embodiment.

On the other hand, in the second common electrode layer 12, the electrode unit 12A, as well as the electrode unit 12B, is disposed so that the electrode unit 12A completely overlapping with at least the at least one non-electrode area of the first common electrode layer 11 in the thickness direction. The adjacent second electrode units in the second common electrode layer 12 are electrically connected to each other with the conducting wires 14, and a common electrical voltage is applied to the electrode units 12A and 12B. Electrical voltages of the first common electrode layer 11 and second common electrode layer 12 are controlled independently of each other.

Also in this display medium 23, since the electrode unit 12A of the second common electrode layer 12 completely overlaps with at least the non-electrode areas of the first common electrode layer 11 in the thickness direction, the disposition of the particles is controlled with a high accuracy by controlling the electrical voltage to be applied to the first common electrode layer 11 and the second common electrode layer 12, as compared to the case in which the display medium has either of the common electrode layers as a common electrode.

Furthermore, in the display medium 23 of the third exemplary embodiment, since the areas where the first common electrode layer 11 and the second common electrode layer 12 overlap each other are lesser than those in the first exemplary embodiment and the second exemplary embodiment, the electrostatic volume between the first common electrode layer 11 and the second common electrode layer 12 is decreased, whereby power consumption is suppressed.

Fourth Exemplary Embodiment

Figure 10:
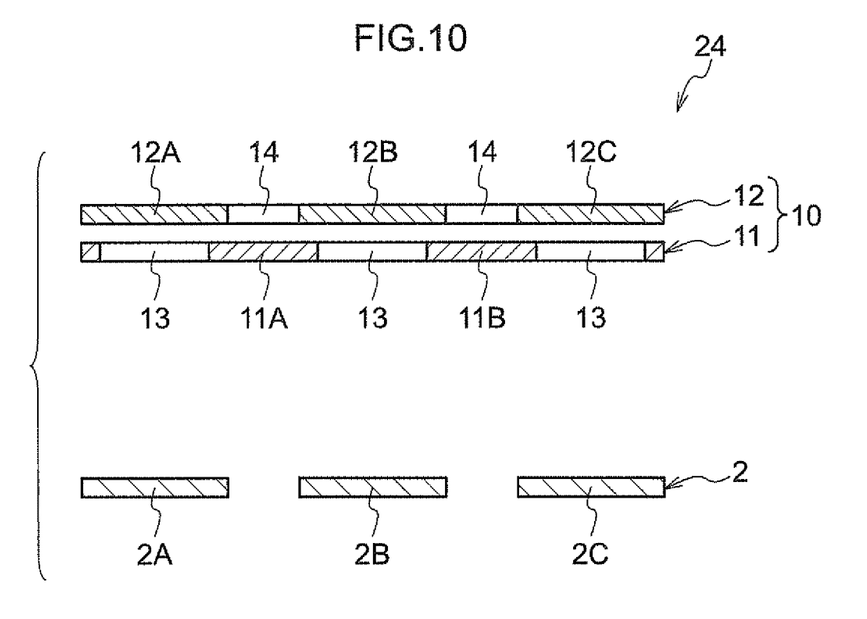
FIG. 10 is a perspective view which schematically shows a disposition of electrodes in a display medium of a fourth exemplary embodiment.

FIG. 10 schematically shows the disposition of the electrodes in the display medium of the fourth exemplary embodiment. In a display medium 24 of the fourth exemplary embodiment, the pixel electrodes 2 are disposed in a similar shape to that in the display medium of the first exemplary embodiment.

On the other hand, in the first common electrode layer 11, the electrode units 12A, 12B and 12C are disposed over regions which respectively include areas opposite to the gaps between the pixel electrodes as in the display medium 22 of the second exemplary embodiment, and the areas opposite to the pixel electrodes are mainly non-electrode areas. Furthermore, the electrode units 12A and 12B are disposed so that each of the second common electrode layer 12 completely overlapping with at least the at least one non-electrode area of the first common electrode layer 11 in the thickness direction. The adjacent electrode units on the second common electrode layer 12 are electrically connected to each other with the conducting wires 14, and a common electrical voltage is applied.

In this display medium as well, since each of the electrode units 12A, 12B and 12C of the second common electrode layer 12 completely overlaps with at least the at least one non-electrode areas of the first common electrode layer 11 in the thickness direction, the disposition of the particles is controlled with a higher accuracy by controlling the electrical voltage to be applied to the first common electrode layer 11 and the second common electrode layer 12, as compared to the case in which the display medium has either of the common electrode layers as a common electrode.

Furthermore, in the display medium 24 of the fourth exemplary embodiment as well, since the areas where the first common electrode layer 11 and the second common electrode layer 12 overlap each other are lesser than those in the first exemplary embodiment and the second exemplary embodiment, power consumption is suppressed.

Figure 15:
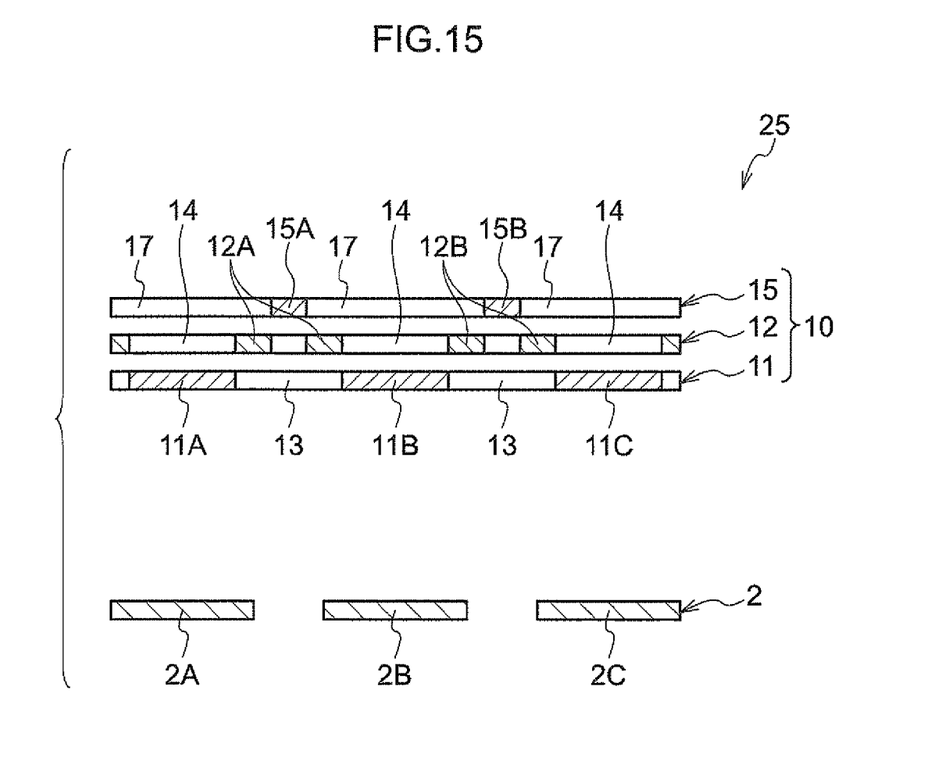
FIG. 15 is a perspective view which schematically shows a disposition of electrodes in a display medium of a fifth exemplary embodiment.

Although the display media and display apparatus of the present exemplary embodiments are explained above with referring to electrophoresis type electronic papers, the invention is not limited to them. For example, three or more common electrode layers may be disposed. For example, as shown in FIG. 15, a display medium 25 on which three electrode layers 11, 12 and 15 are disposed as common electrodes may be used. In this display medium 25, the adjacent pixel units are respectively connected by the electrode wires 13, 14 and 17 with respect to each of the common electrode layers 12, 12 and 15, and a common electrical voltage is applied with respect to each layer.

Alternatively, for example, a display medium and a display apparatus may include a display layer which changes display according to an electrical field such as a liquid crystal, an organic electroluminescence layer and an inorganic electroluminescence layer.

What is claimed is:

1. A display medium comprising:
    a pair of substrates that are oppositely disposed across a first gap, at least one of the substrates having transparency;
    pixel electrodes disposed on one of the pair of substrates;
    a common electrode that is disposed on the other substrate of the pair of substrates oppositely to the pixel electrode across a second gap, that comprises two or more common electrode layers comprising a first common electrode layer and a second common electrode layer, the first common electrode layer and the second common electrode layer being disposed across a third gap in a thickness direction, and electrical voltages of the first common electrode layer and the second common electrode layer being controlled independently of each other, the first common electrode layer comprising at least one electrode unit and at least one non-electrode area corresponding to a disposition of the pixel electrodes, and the second common electrode layer comprising at least one second electrode unit, the at least one second electrode layer completely overlapping with at least the at least one non-electrode area of the first common electrode layer in a thickness direction; and
    a display layer that is disposed between the pixel electrodes and the common electrode, which displays in accordance with an electrical field formed between the pixel electrodes and the common electrode.

2. The display medium of claim 1, wherein the first common electrode layer is disposed between the second common electrode layer and the pixel electrodes, and the second common electrode layer is an entire-area electrode that completely overlaps with the entire first common electrode layer in the thickness direction.

3. The display medium of claim 1, wherein the second common electrode layer comprises:
    at least one second non-electrode area that is completely overlapped by the at least one electrode unit of the first common electrode layer in a thickness direction; and
    the at least one second electrode unit completely overlapping with at least the at least one non-electrode area of the first common electrode layer in the thickness direction.

4. A display apparatus comprising:
    the display medium of claim 1; and
    an electrical voltage controlling unit that separately controls an electrical voltage applied to the pixel electrode of the display medium, and an electrical voltage applied to the common electrode.

5. The display apparatus of claim 4, wherein the display layer comprises first particles and second particles that are different from each other at least in color and electrical charge, and in a case in which a single color is to be displayed on an entire surface by either of the first particles and second particles, the electrical voltage controlling unit applies an electrical voltage by which the second common electrode layer attracts the one of the particles more than the first common electrode layer does, and in a case in which an image is to be displayed by the other of the first particles and second particles, the electrical voltage controlling unit applies an electrical voltage by which the first common electrode layer attracts the other particles more than the second common electrode layer does.

* * * * *